3,819,780
INJECTION MOLDING OF NYLON FOAM PANELS
Norman Stewart Anderson, Hexagon House,
Blackley, Manchester, England
No Drawing. Original application Jan. 5, 1971, Ser. No. 104,161, now Patent No. 3,702,280. Divided and this application Aug. 21, 1972, Ser. No. 282,059
Int. Cl. B29d 27/00
U.S. Cl. 264—45    7 Claims

ABSTRACT OF THE DISCLOSURE

Process for the manufacture of a nylon panel wherein a nylon material is injected into an adjustable thickness panel mould and then a foamable nylon material containing as blowing agent, an oxalic acid derivative, is injected before the first nylon material has solidified so that the mould cavity is filled without foaming and then the thickness of the mould cavity is increased to allow the foamable composition to foam.

---

This application which relates to the manufacture of nylon panels is a divisional of my Application Ser. No. 104,161 filed January 5, 1971, now U.S. Patent 3,702,280.

Our U.K. Pat. No. 1,156,217 describes and claims a process for the production of articles having a cellular core and an unfoamed surface skin comprising injecting a predetermined amount of an unfoamable thermoplastic resin into mould cavity and subsequently, and before the central portion of said unfoamable thermoplastic resin has set, injecting a thermoplastic resin composition containing a blowing agent at a temperature at or above the activation temperature of the blowing agent into the charge of the unfoamable thermoplastic resin that is in the mould cavity and maintaining the composition within the cavity for sufficient time to allow or cause the foamable composition to foam and the thermoplastic materials to set.

Such a process is applicable to the production of panels from any thermoplastic material which may be injection moulded and blown into foam. The production of satisfactory nylon panels by the process has however been impeded by the difficulties encountered in manufacturing nylon foam of good quality. It is an object of the present invention to provide a process for the manufacture of high quality nylon panels having a foamed cellular core and an unfoamed surface skin.

According to the present invention I provide a process for the manufacture of a panel comprising injecting into panel forming mould cavity of adjustable thickness a sufficient amount of unfoamable nylon material, as hereinafter defined, to form skin of thickness 0.2 to 3 mm., preferably 0.5 to 2 mm. and subsequently, and before the central portion of the said nylon material has set, injecting into the nylon material that is in the mould cavity a foamable nylon material composition, as hereinafter defined, the amount of foamable nylon material composition being such as will provide, with the skin, a panel of average density 0.2 to 0.9, and preferably 0.3 to 0.7, g. cm.$^{-3}$ when expansion to an overall thickness of 2.5 to 25, and preferably 5 to 15, mm. has taken place, and the initial thickness of the mould being adjusted so that the unfoamable nylon material and foamable nylon material composition charged thereto together fill the mould before any foaming occurs, the said foamable nylon material composition being at a temperature at or above the activating temperature of the blowing agent, and thereafter enlarging the mould to an overall thickness of 2.5 to 25 mm., preferably 5 to 15 mm., and maintaining the material within the cavity for sufficient time to cause the foamable nylon material composition to foam and thereby fill the enlarged mould and both nylon materials to set.

By this process there may be produced a panel comprising a core of nylon material in foam form, said core being formed integrally with a covering skin of nylon material, the foam having an average pore diameter of less than 1.5 mm., preferably less than 0.75 mm., and being substantially free from pores greater than 3 mm. in diameter, the thickness of the covering skin being 0.2 to 3 mm., preferably 0.5 to 2 mm., the overall thickness of the panel being from 2.5 to 25 mm., preferably from 5 to 15 mm., the average density of the panel being 0.2 to 0.9 g. per cc. preferably 0.3 to 0.7 g. per cc. and the relationship of impact strength in Joules (S) to weight per unit area (W) in g. per square cm. being such that $$\frac{\log_{10} S}{W} > 2$$

The expression "nylon material" refers to thermoplastic polymers of molecular weight above 10,000 and Vicat softening point 150° to 300° obtained essentially by the condensation of diamines with dicarboxylic acids and/or self condensation of amino acids or lactams, the said polymers having monomer units of the formulae

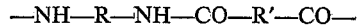

and/or

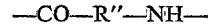

wherein R and R' may represent straight or branched chain alkylene radicals of 4–13 carbon atoms, m- or p-phenylene radicals or 1,4-cyclohexylene radicals or additionally R' may represent a direct linkage, and R" may represent a straight chain alkylene radical of 3 to 5 carbon atoms or a 1,4-cyclohexylene radical. It will be understood that the nylon material may be a polymer in which there is regular repetition of monomer units or a polymer containing any number of different monomer units.

A preferred type of "nylon material" is nylon 6.6/6.iP (a copolymer from hexamethylene diamine adipate and hexamethylene diamine isophthalate), especially such material having a Vicat softening point above 240° C. Another preferred type of "nylon material" is nylon 6 (polycaprolactam).

Nylon material comprising the skin of the panels may be identical with or different from that comprising the foamed core.

The foamed core and more particularly the skin may contain other materials, for example pigments, fillers, fibres (e.g. glass fibre) or plasticisers; the skin may advantageously contain a mould release agent and the foamed core may contain a nucleating agent to assist the formation of bubbles.

When the panels of the invention are substantially free from fillers, more particularly in the skin, they should preferably have a weight per unit area of 0.25 to 1.15 g. per sq. cm., especially 0.35 to 0.70 g. per sq. cm. The impact strength of such panels (measured on a dry as-moulded specimen at 25° C. by British Standard 2782 Method 306B) is high, being for example not less than 10J when the weight per unit area is 0.5 g. per sq. cm.

The nylon panels of the invention are light in weight but have very good strength. They have potential for the construction of load-bearing structures in the building and furniture industries. For such purposes they can, if desired, be formed with ribs, ridges or other similar formations to provide added strength, and with linking or fixing lugs or other features. The panels may also form part of moulded articles such as trays, boxes, tanks, articles of furniture, interior car trims and car body panels.

The foamable nylon material compositions which are used in the process of the invention comprise nylon material as hereinbefore defined and, as a blowing agent, an oxalic acid derivative wherein one COOH group has been esterified with an alcohol or polyol and the other COOH group has been esterified with an alcohol, polyol or phenol or converted to a substituted amide group. The manufacture of polyamide foam using this type of blowing agent is described and claimed in our copending U.K. application No. 2,245/70 and that subject is claimed in corresponding U.S. Pat. 3,758,424 which also provides specific examples of such blowing agents.

Blowing agents of this type may comprise an oxalic acid derivative of the formula

wherein R is an aliphatic radical and X is a radical of the formula —OR, —OAr (where Ar is an aromatic radical) or —NR$_1$R$_2$ where R$_1$ is an aliphatic or aromatic radical, R$_2$ is hydrogen or an aliphatic or aromatic radical, or R$_1$ and R$_2$ together represent the atoms necessary to form a heterocyclic group together with or excluding the amide nitrogen atom.

In the oxalic acid derivatives of the above formula:

the radical R may be, for example, a straight or branched chain alkyl radical, particularly of from 1 to 12 carbon atoms e.g. methyl, ethyl, lauryl. (Such radicals may be substituted, for example by hydroxy or alkoxy e.g. methoxy groups):

an aryl radical represented by Ar may be for example phenyl or tolyl:

aliphatic radicals represented by R$_1$ and R$_2$ may be for example alkyl radicals, particularly of from 1 to 6 carbon atoms e.g. methyl, ethyl, propyl or butyl:

aryl radicals represented by R$_1$ and R$_2$ may be for example phenyl or tolyl:

heterocyclic radicals formed by R$_1$, R$_2$ and the nitrogen atom may be for example piperidyl:

heterocyclic radicals formed by R$_1$ and R$_2$ may be for example triazinyl.

Specific blowing agents of the above formula are:

| | |
|---|---|
| n-C$_4$H$_9$OCO·CONH(CH$_2$)$_6$NHCO·COOC$_4$H$_9$-n | I |
| C$_2$H$_5$OCO·CONH(CH$_2$)$_6$NHCO·COOC$_2$H$_5$ | II |
| CH$_3$OCH$_2$CH$_2$OCO·COOCH$_2$CH$_2$OCH$_3$ | III |
| CH$_3$(CH$_2$)$_3$CH(C$_2$H$_5$)CH$_2$OCO·COOCH$_2$CH(C$_2$H$_5$)(CH$_2$)$_3$CH$_3$ | IV |
| C$_{12}$H$_{25}$OCO·COOC$_{12}$H$_{25}$ | V |
| C$_2$H$_5$OCO·CONHC$_6$H$_5$ | VI |
| C$_2$H$_5$OCO·COOC$_6$H$_4$OCO·COOC$_2$H$_5$ | VII |

It is preferred in the process of the invention to employ as blowing agent an ester formed by esterification of oxalic acid with a polyol, particularly ethylene glycl. Esters made in this way are mainly polymeric and may contain several individual compounds. Mixtures of esters produced by the direct esterification process may be used, such mixtures being for convenience designated polyesters. Thus for example the product obtained by esterifying oxalic acid with ethylene glycol is designated poly(ethylene oxalate).

The proportion of such blowing agents relative to polyamide may be for example from 0.1 to 10% by weight depending upon the particular blowing agent and polyamide used and the density of foam wanted. In general proportions of 0.5 to 3% by weight are preferred.

Advantageously the foamable nylon material compositions used in the process of the invention may also contain a surface active agent, preferably of the non-ionic type, in order to preserve a fine dispersion of gas bubbles during the transition to rigid foam. The use of surface active agents in the production of polyamide foams is within the claims of our United Kingdom Pat. No. 1,208,782. Some of the most effective surface active agents are long chain alkylphenols, alkanols or alkylamines containing at least 6 carbon atoms, and condensates thereof with an alkylene oxide preferably containing from 1 to 30 moles of alkylene oxide. Especially effective surface active agents are alkanols containing 10 to 20 carbon atoms e.g. cetyl alcohol and condensates of such alcohols with up to 6 moles of an alkylene oxide e.g. ethylene oxide per mole of alkanol. The product of this type which is sold by Imperial Chemical Industries Limited under the name Lubrl MOA (Registered Trademark) is particularly effective. Other especially effective surface active agents are condensates of alkylamines, containing 10 to 20 carbon atoms, with up to 5 moles of an alkylene oxide, e.g. ethylene oxide per mole of alkylamine. The product of this type which is sold by Armour Hess Chemicals Limited, under the name Ethomeen s/12 is particularly effective.

The process of the invention may be carried out in the various ways which are described in our published U.K. Patent Specification No. 1,156,217. Panels produced thereby are found to have the characteristics hereinbefore defined.

In my process the foamable nylon material composition is injected into the mould at such high speed and under such high pressure that foaming is substantially prevented until the mould cavity is filled, and the mould cavity is enlarged after the injection of all the charges to cause the foamable nylon material composition to foam. The mould cavity may be enlarged instantaneously or gradually either by reducing the locking forces on the mould so that it is enlarged by the forces generated by the decomposition of the blowing agent or by mechanical opening of the mould. Standard injection moulding conditions have been found to be satisfactory for the operation of this process.

In a further embodiment, after a sufficient amount of nylon material to form the skin has been injected into the mould, the two halves of the mould may be urged together to distribute the material to the extremities of the mould cavity and the charge of the foamable nylon material composition then injected. If the first charge is not distributed to the extremities of the mould cavity a line tends to be formed in the surface of the moulding corresponding to the position of the edge of the first charge within the mould cavity prior to the injection of the next charge of material.

In a further preferment of my process for manufacturing the panels of the present invention, a second charge of the skin-forming nylon material is injected into the mould after the charge of the foamable nylon material composition. This preferred process has two advantages; firstly it ensures that any material remaining in the sprue of the moulding machine after the first moulding cycle is of the skin forming polymer and thus prevents the materials from mixing during the next moulding cycle and secondly ensures that when the sprue is cut away from the moulding, an unfoamed and not a foamed area is exposed.

The invention is illustrated but not limited by the followin Examples in which all parts and percentages are by weight unless otherwise stated. Relative viscosity values are as measured at 25° C. on an 8.4% solution in aqueous formic acid of 90% strength.

The following abbreviations are used:

nylon 6—polycaprolactam
nylon 6.6—polyhexamethyleneadipamide
nylon 6.12—polyhexamethylenedodecandiamide
nylon 6.10—polyhexamethylenedecandiamide
nylon 6.6/6.iP—copolymer from hexamethylenediamine adipate and hexamethylenediamine isophthalate
nylon 6.6/6/6.10—copolymer from hexamethylenediamine adipate caprolactam and hexamethylene diamine decandoic acid salt.

EXAMPLE 1

A copolymer of nylon 6.6 and hexamethylene isophthalamide of molar proportions 90:10 and of relative viscosity 43 was dried in vacuo at 100° C. for 24 hours. It was then tumble blended with a silica nucleant (0.2% by weight) and poly-(ethylene oxalate) (2% by weight; material which had passed through a 30 mesh screen). Lubrol MOA (2% volume/weight) was then added and tumble blended with the coated chips. The chips coated with surfactant, blowing agent and nucleant were then further dried in a vacuum oven at 80° C. for 16 hours.

The coated chips were fed into one barrel of a two-shot injection moulding machine. The barrel temperatures, registered by thermocouples were 250° C. (rear), 260° C. (middle) and 275° C. (front). Into the second barrel of the injection moulding machine was fed a dried copolymer of nylon 6.6 and hexamethylene isophthalamide (of molar proportions 90/10 and of relative viscosity 43). The untreated copolymer and the foamable composition were injection moulded by the technique described in U.K. Specification 1,156,217 to give panels with a non-foamed skin and a foamed core. The mouldings were about 1 cm. thick with skin thickness 0.5 to 1.1 mm. and average density 0.48 g. cm.$^{-3}$. They had impact strengths of about 10J. Foam structure was very fine, with an average pore size of less than 0.1 mm.

The maximum injection pressure (ca 1000 kg./cm.$^2$) and rate settings on the moulding machine were employed and injection was complete in 5½ seconds. The total charge of foamable and non-foamable polymer was sufficient to fill the mould completely prior to expansion.

EXAMPLE 2

Dry nylon 6.6 polymer chip, of relative viscosity 45, was tumble blended with a silica nucleant (0.4%), poly (ethylene oxalate) (2%) and Ethomeen S/12 (1.5%). Iylon powder (0.6%) was also added to improve the flow of the polymer granules.

This foamable material was used to prepare foamed core panels in the manner described in Example 1; the skin polymer was the 90/10 6.6/6.iP copolymer used in that example.

Mouldings were obtained having a somewhat coarser foam structure than those obtained in Example 1 with a larger proportion of pores of greater than 1.5 mm. Average pore size was less than 0.2 mm. The mouldings had total thickness 12 mm. with skin thickness in the range 0.5–1.2 mm., and average density 0.43 g. cm.$^{-3}$, and impact strengths of about 11J.

Mouldings with similar properties may be made in a similar manner using the copolyamide prepared from oxalic acid and a mixture of the diamines hexamethylenediamine, 2,2,4-trimethyl hexamethylenediamine and 2,4,4-trimethylhexamethylenediamine (molar ratio 60:20:20).

EXAMPLE 3

The same foamable composition described in Example 1 was used, with the same moulding conditions, but nylon 6 polymer was used in the second barrel of the injection moulding machine with temperatures 30° C. lower along the barrel. The sequence of operations on the moulding machine was arranged so that after injection of the foamable composition a further small quantity of nylon 6 polymer was injected from the second barrel of the machine, thus purging foamable material from the sprue. In this way, when the sprue was cut from the moulding an unfoamed area was exposed and a continuous surface of 6-nylon was maintained.

With this combination mouldings were made having essentially a nylon 6 skin and a 6.6/6.iP copolymer foamed core. The mouldings of total thickness 10 mm., skin thickness 0.7–1.0 mm., and average density 0.5 g. cm.$^{-3}$, had impact strength of 10 to 11J. Mean pore size of the foam was similar to that in Example 1.

EXAMPLE 4

Dry nylon 6 polymer was tumble blended with a silica nucleant (0.4%), poly(ethylene oxalate) (2%), Ethomeen S/12 (1.5%) and nylon 6 powder (1%) to produce a foamable composition.

Both barrels of the two-shot injection moulding machine were heated to 220° C. (rear), 235° C. (middle) and 250° C. (front). The foamable composition was fed to one barrel and similar but uncoated nylon 6 chip was fed to the other.

Using the technique described in previous examples mouldings were made having a nylon 6 skin and a nylon 6 foamed core. Foam structure was similar to that obtained with the 6.6/6.iP copolymer described in Examples 1 and 3 but with a higher proportion of larger pores including a few with diameter of greater than 2 mm. The impact properties of the mouldings however were good averaging about 20J for a panel of total thickness 10.1 mm., skin thickness 0.6 to 1.0 mm., and average density 0.46 g. cm.$^{-3}$.

EXAMPLE 5

Chips of a nylon 6.6/6/6.10 (40:30:30) copolymer were tumble blended with a silica nucleant (0.4%), poly-(ethylene oxalate) (2%) and Ethomeen S/12 (1.5%). This foamable composition was fed to one barrel of a two-shot moulding machine having barrel temperatures set to 155° C. (rear), 184° C. (middle), 194° C. (front).

At the same time the 6.6/6.iP (90:10) copolymer described in Example 1 was fed to the second barrel of the machine under the temperature conditions given there.

By the procedure described in previous Examples mouldings were obtained having a 6.6/6.iP copolymer skin and a 6.6/6/6.10 copolymer foamed core. The basic foam structure was very fine with mean pore size less than 0.05 mm. though there were some small voids measuring 2 to 3 mm. distributed throughout the mouldings. Impact properties of the panels were excellent; test pieces from a panel of total thickness 13.3 mm., skin thickness 0.8–1.1 mm., average density 0.41 g. cm.$^{-3}$ survived impacts of 50J.

EXAMPLE 6

Using the foamable composition of Example 1, but as skin polymer a standard grade of nylon 6.6 containing 30% short glass fibre, mouldings were made as described in Example 1 but having a glass-filled nylon 6.6 skin. It was necessary to use temperatures set about 10° C. higher in the barrel containing the skin polymer. The mouldings were similar in structure but with enhanced rigidity compared with those made with an unfilled skin. The impact strength of a panel of 9.1 mm. thick, with skins 1 mm. thick, average density 0.49 g. cm.$^{-3}$ was 8J. Foam structure was similar to that in Example 1.

I claim:

1. A process for the manufacture of a panel comprising injecting into panel-forming mould cavity of adjustable thickness a sufficient amount of a first, unfoamable, nylon material to form skin, in the resultant panel, of thickness 0.2 to 3 mm. and subsequently, and before the central portion of the said nylon material has set, injecting into the nylon material that is in the mould cavity a foamable nylon material composition comprising a second nylon material and a blowing agent at a temperature at or above the activating temperature of the blowing agent, said blowing agent consisting of an oxalic acid derivative wherein one COOH group of the oxalic acid has been esterified with an alcohol or polyol and the other COOH group of the oxalic acid has been esterified with an alcohol, polyol or phenol or converted to a substituted amide group, said first and second nylon materials being selected from thermoplastic polymers of viscosity average molecular weight above 10,000 and Vicat softening point of 150° to 300° C. and having monomer units selected from the group consisting of the formulae

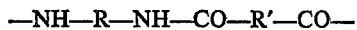

and

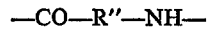

and mixtures thereof wherein R and R' represent straight or branched chain alkylene radicals of 4–13 carbon atoms, *m*- or *p*-phenylene radicals or 1,4-cyclohexen radicals or additionally R' may represent a direct linkage, and R" may represent a straight chain alkylene radical of 3 to 5 carbon atoms or a 1,4-cyclohexylene radical, the amount of foamable nylon material composition being such as will provide, with the skin, a panel of average density 0.2 to 0.9 g. cm.$^{-3}$ when expansion to an overall thickness of 2.5 to 25 mm. has taken place, and the initial thickness of the mould being adjusted so that the unfoamable nylon material and foamable nylon material composition charged thereto together fill the mould before any foaming occurs, and thereafter enlarging the mould to an overall thickness of 2.5 to 25 mm. and maintaining the material within the cavity for sufficient time to cause the foamable nylon material composition to foam and thereby fill the enlarged mould and both nylon materials to set.

2. Process according to Claim 1 wherein the foamable nylon material composition contains as blowing agent poly(ethylene oxalate) the ester produced by esterification of oxalic acid with ethylene glycol.

3. Process according to Claim 1 wherein the foamable nylon material contains a surface active agent of the non-ionic type.

4. Process according to Claim 3 wherein the surface active agent is an alkanol containing 10 to 20 carbon atoms or a condensate thereof with up to 6 moles of an alkylene oxide per mole of alkanol.

5. Process according to Claim 3 wherein the surface active agent is a condensate of an alkylamine containing 10 to 20 carbon atoms with up to 5 moles of an alkylene oxide per mole of alkylamine.

6. Process according to Claim 1 wherein after a sufficient amount of nylon material to form the skin is injected into the mould cavity the components forming the mould are urged together to distribute the nylon material to the extremities of the mould cavity and the foamable nylon material composition is then injected.

7. Process according to Claim 1 wherein a second charge of the skin-forming nylon material is injected into the mould after the charge of the foamable nylon material composition.

References Cited

UNITED STATES PATENTS

| | | | |
|---|---|---|---|
| 3,378,612 | 4/1968 | Dietz | 264—45 |
| 3,627,736 | 12/1971 | Raum et al. | 264—DIG. 61 |
| 3,654,196 | 4/1972 | Moore et al. | 264—DIG. 14 |

FOREIGN PATENTS

| | | | |
|---|---|---|---|
| 1,176,813 | 1/1970 | Great Britain | 264—45 X |
| 1,156,217 | 6/1969 | Great Britain | 264—45 X |
| 1,208,782 | 10/1970 | Great Britain | 264—51 X |

OTHER REFERENCES

Plastics Dept.: E. I. du Pont de Nemours & Co. (Inc.) Bulletin FE–4008 (Zytel Iylon Resins).

H. S. COCKERAM, Primary Examiner

U.S. Cl. X.R.

156—78; 161—160, 165, 227; 264—54

UNITED STATES PATENT OFFICE
CERTIFICATE OF CORRECTION

Patent No. 3,819,780                    Dated June 25, 1974

Inventor(s)   NORMAN STEWART ANDERSON

It is certified that error appears in the above-identified patent and that said Letters Patent are hereby corrected as shown below:

Please add the following to the front page format after the serial number:

-- Claims priority, application Great Britain,
    January 16, 1970, 2245/70.--

Please add the following to the front page format after the inventor's name and address:

--, assignor to Imperial Chemical Industries Limited,
    London, England.--

Also, please make the following corrections:

IN THE SPECIFICATION:

Col. 3, line 40, in formula I, "-n", at the right-hand side, should be -- (n) --;

line 53, "glycl" should be --glycol--.

Col. 4, lines 56 and 57, "followin" should be --following--.

Col. 5, line 34, "Iylon" should be --Nylon--.

IN THE CLAIMS:

Claim 1, col. 7, line 3, "cyclohexen" should be --cyclohexene--.

Signed and sealed this 5th day of November 1974.

(SEAL)
Attest:

McCOY M. GIBSON JR.                    C. MARSHALL DANN
Attesting Officer                      Commissioner of Patents